United States Patent [19]

Hayashi

[11] Patent Number: 5,048,506
[45] Date of Patent: Sep. 17, 1991

[54] CONTAINER FOR HEATING CANNED FOOD AND CAN MAIN BODY USED THEREFOR

[75] Inventor: Yuichi Hayashi, Soka, Japan

[73] Assignee: Koshin Shoji Co., Ltd., Tokyo, Japan

[21] Appl. No.: 635,010

[22] Filed: Dec. 28, 1990

[30] Foreign Application Priority Data

Oct. 6, 1990 [JP] Japan .............. 2-105484[U]

[51] Int. Cl.⁵ ............................................ A47G 23/04
[52] U.S. Cl. .................................................. 126/262
[58] Field of Search ........................................ 126/262

[56] References Cited

U.S. PATENT DOCUMENTS 3,566,857 3/1971 Price ..................................... 126/262
4,784,112 11/1988 Hayashi ............................... 126/262

Primary Examiner—Carroll B. Dority
Attorney, Agent, or Firm—Armstrong, Nikaido, Marmelstein, Kubovcik & Murray

[57] ABSTRACT

A container for heating canned food comprising a can main body having a protrusion on the side covered with a safety metal stripe formed integrally with a detachable lid, and a heater casing for receiving the can main body therein and having a lateral engaging groove for engaging the protrusion on the can main body. The protrusion on the can main body is so adapted that it can not engage the lateral engaging groove of the casing unless the lid is detached and the metal stripe is removed from the protrusion.

5 Claims, 3 Drawing Sheets

CONTAINER FOR HEATING CANNED FOOD AND CAN MAIN BODY USED THEREFOR

BACKGROUND OF THE INVENTION

1. Field of the Invention

The present invention concerns a container for heating canned food comprising a can main body and a heater casing, which can be transported and carried about being fit in a compact structure and which can heat or canned food upon taking them in the outdoor or the like, as well as a can main body used for the container for heating canned food.

2. Description of the Prior Art

There are such canned foods that taste more delicious when they are boiled or warmed. However, if a metal can such as made of tin or aluminum is heated as it is with a lid being closed, it will be extremely dangerous since the can may possibly be burst by the heat expansion of contents.

In view of such danger, even if canned foods taste more delicious by heating, canners usually hesitate to indicate this on can bodies etc.

For overcoming this problem, it may be considered to use a lid made of a thermoplastic resin so that the lid is spontaneously opened when the canned contents are heat-expanded. However, a can has to be tightly sealed under high vacuum and applied with heat-sterilization for enabling long time storage. A lid made of a thermoplastic resin can not endure such severe processing conditions.

OBJECT OF THE INVENTION

It is, accordingly, a first object of the present inventions to provide a container for heating canned food capable of always ensuring safety heating of a metal can such as made of tin or aluminum.

A second object of the present invention is to provide a container for canned heating food capable of attaining functions of heating and warming the canned foods, as well as extinguishing heating flame by simple procedures.

A third object of the present invention is to provide a container for heating canned food, in which portions of a heater casing which are bent for forming air intake ports can also be utilized as legs for setting the heater casing.

A fourth object of the present invention is to provide a can main body which is suitable to be used in a container for heating canned food.

SUMMARY OF THE INVENTION

The first object of the present invention can be attained by a container for heating canned food, comprising a heater casing having a hollow cylindrical member for containing a solid fuel at the bottom and a can main body which can be fit into and pulled out of the heater casing, wherein the can main body has a lid which can be detached from the can main body along a cut line, one or more of protrusions formed integrally on the side of the can main body and a safety metal stripe having a base end integrally connected to the lid, a top end formed with a recess for covering one of the protrusions and a portion which is provisionally connected to the side or the protrusion of the can main body and can be released therefrom when the stripe is pulled downward from above, and the heater casing has one or more of vertical guide grooves for integrally receiving the protrusions on the can main body and the recess of the safety metal stripe covering the protrusion and one or plurality stages of lateral engaging grooves formed in communication with the vertical guide grooves for engaging the protrusions of the can main body.

Preferably, the protrusions on the can main body are disposed by a pair in a diametrical symmetry around the circumferential periphery of the can main body and the guide grooves and the lateral engaging grooves are disposed each by pair in a diametrical symmetry around the circumferential periphery of the casing corresponding to the protrusions on the can main body.

The second object of the present invention can be attained by the container for heating canned food as described above, wherein a plurality stages of the lateral engaging grooves in the heater casing are formed continuously by way of connection steps, and downcoming grooves are formed in contiguous with the top end of the lateral grooves at the lowest stage.

The third object of the present invention can be attained by the container for heating canned food as described above, wherein a plurality of incision portions that can be opened along cut lines are formed around the lower periphery of the heater casing.

The fourth object of the present invention can be attained by the can main body comprising a lid which can be detached therefrom along a cut line and, one or more of protrusions integrally formed on the side of the can main body and a safety metal stripe having a base end integrally connected to the lid, a top end formed with a recess for covering one of the protrusions and a portion which is previously connected to the side or the protrusion on the can main body and can be released therefrom when the stripe is pulled downward from above.

In the container for heating canned food according to the present invention, the can main body is usually fit as far as the bottom of the heater casing. When one intends to take the canned food, the can main body is pulled upward to engage the protrusion into the lateral engaging groove of the casing and, thereafter, a solid fuel is burnt to heat the canned food. Since the protrusion on the can main body is covered by the recess formed at the top end of the safety metal stripe connected to the lid that can be detached from the main can body and since the safety metal stripe is connected, preferably, at the top end thereof to the side or the protrusion of the can main body so that the stripe can be released therefrom upon pulling down the metal stripe from above, the protrusion on the can body can not be engaged to the lateral engaging groove of the heater casing unless the safety metal stripe is removed.

In a case where the lid is detached from the can main body along the cut line and the connection portion of the metal stripe with the side or the protrusion of the can main body is released by pulling down lid together with the metal stripe, the safety belt metal can removed, by which the protrusion on the can main body can be engaged into the lateral engaging groove of the casing to enable heating. In this way, the present invention is structured such that the canned food can not be heated unless the lid of the can main body is taken off.

In a modified embodiment where a plurality stages of lateral engaging grooves are formed continuously in the heater casing, the gap between the can main body and the fuel can be controlled by merely displacing the protrusion of the can main body along the lateral engaging groove of the casing.

In a further embodiment where incision portions that can be opened are formed around the lower periphery of the heater casing, air intake ports are formed by opening the incision portions. Especially, when the incision portions are opened outwardly and bent downwardly can be utilized as legs for setting the heater casing.

BRIEF DESCRIPTIONS OF THE ACCOMPANYING DRAWINGS

These and other objects, as well as advantageous features of the present invention will become apparent by reading the following descriptions for the preferred embodiments according to the present invention with reference to the accompanying drawings, wherein FIG. 1 is a perspective view illustrating the entire structure of a preferred embodiment of a container for heating canned food according to the present invention;

FIG. 2 is a partially cut-away exploded perspective view of the container shown in FIG. 1;

FIGS. 3(a) and (b) are, respectively, plan views for explaining the connection between a lid and a safety metal stripe;

FIG. 4 is a cross sectional view for a portion of the container taken along line IV—IV in FIG. 1; and FIG. 5 is an explanatory view for the container during heating.

DESCRIPTION OF THE PREFERRED EMBODIMENT

The prevent invention will now be described more in details referring to the illustrated embodiment.

Figure 1:
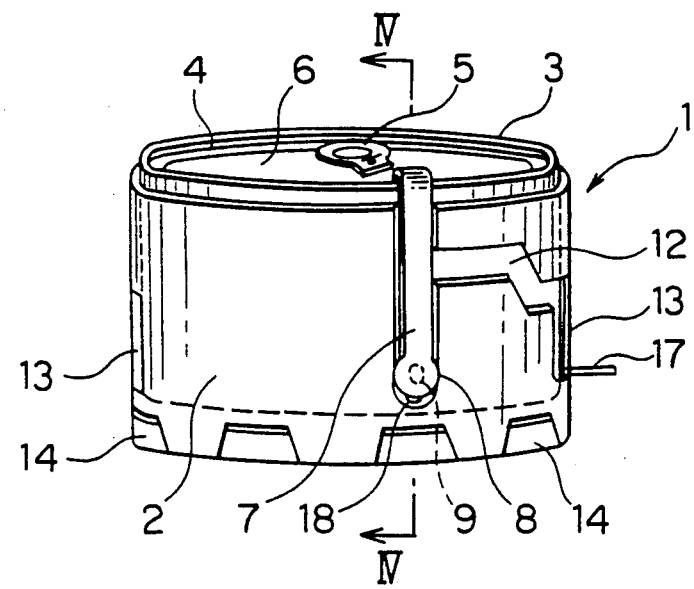

As shown in FIG. 1, a container 1 for heating canned food according to the present invention comprises a hollow cylindrical heater casing 2 opened at the upper end and a can main body 3 which can be fit into and pulled out of the casing 2. FIG. 1 shows the container in a state where it is shipped, put on sale and carried about, in which both of the members are integrally fit to each other.

The can main body 3 is a metal can such as made of tin or aluminum having a structure capable of enduring vacuum sealing and high temperature sterilization in a state charged with various kinds of canned foods.

Figure 2:
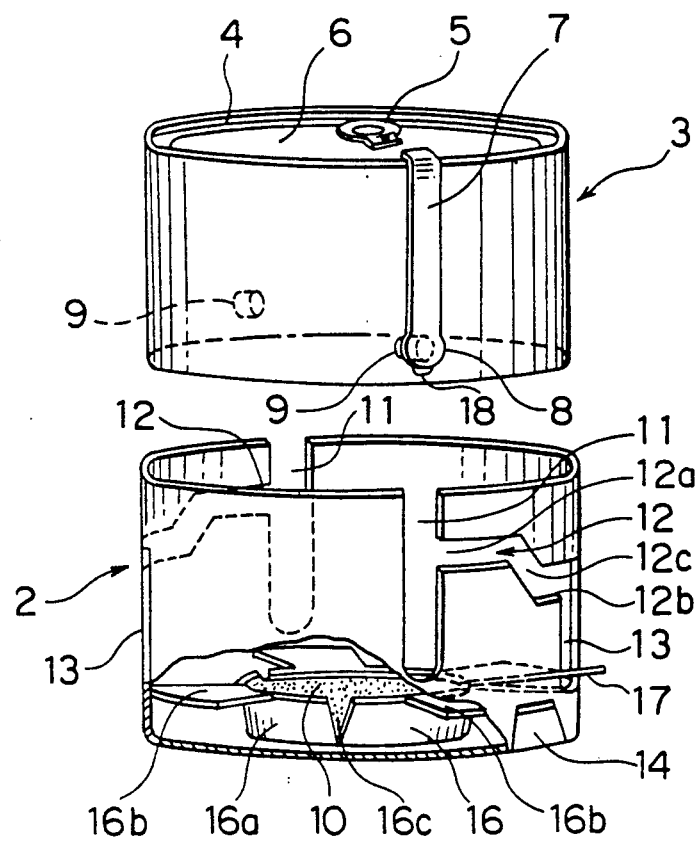

As shown in FIG. 2, the can main body 3 has, at its top, a lid 6 which can be mannually detached therefrom along an incised cut line 4 by a pulling means such as a grip 5, and a safety metal stripe 7 is integrally connected to the lid 6.

The safety metal stripe 7 is bent orthogonally at its upper portion, extends as far as the lower portion of the can main body 3 along the side thereof and has a recess 8 formed at its top end (lower end) in a spoon-like shape with the concave surface being directed to the side of the can main body.

Figure 4:
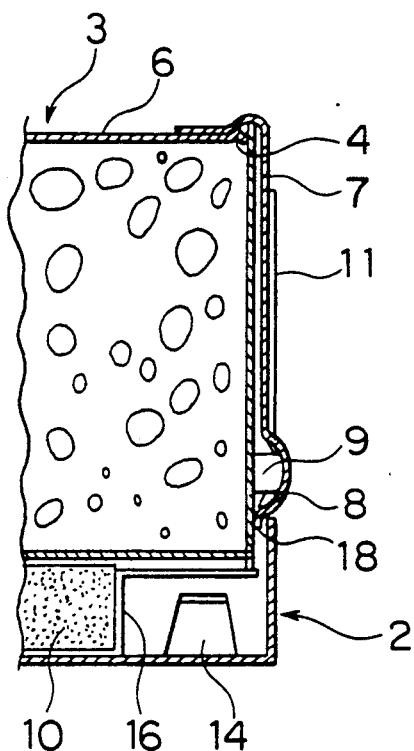

As shown in FIG. 4, a protrusion 9 is integrally disposed on the side of the can main body 3 at a position corresponding to the recess 8 of the metal stripe 7 and the protrusion is covered with the recess 8 of the metal stripe 7.

Further, as shown in FIGS. 2 and 4, the top end of the safety metal stripe 7 is secured to the side of the can main body at a connection portion 18 such that it can be released from the side of the can body when the metal stripe 7 is pulled downward from above.

The connection portion 18 may be attached by any optional means such as welding or adhesion providing that the portion 18 is connected at such a strength that it can not easily be peeled off by a finger or the like, but can be released when the lid 6 is opened and the safety metal stripe 7 is pulled downward from above.

The safety metal stripe 7 is connected preferably but not restrictively at its top end. Further, the metal stripe 7 is connected not only to the side but also to the top end of the protrusion 9.

Figure 3A:
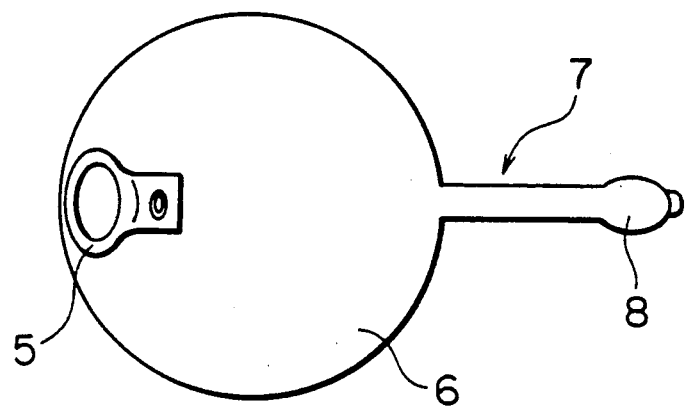
Figure 3B:
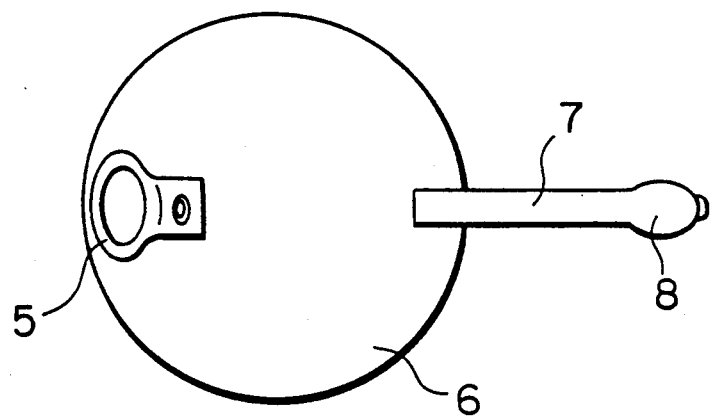

The safety metal stripe 7 may be formed integrally with the separatable lid 6 as shown in FIG. 3(a) or a metal stripe 7 formed separately from the lid 6 may be integrally bonded thereto, for example, by means of welding as shown in FIG. 3(b). In any of the cases, the metal stripe 7 is so formed that it is released from the can main body 3 integrally with the lid 6 when the latter is taken off from the can main body 3.

The heater casing 2 is made of metal such as tin, aluminum or like other heat resistant material. As shown in FIG. 2, the casing 2 comprises a hollow cylindrical member containing a solid fuel 10 at the bottom of the inside, and the side plate of the casing 2 has a vertical guide groove 11 for integrally receiving the protrusion 9 on the can main body 3 and the recess 8 of the metal stripe 7 covering the protrusion 9.

In a case where when the top end of the metal stripe 7 is connected to the side of the can main body 3 the guide groove 11 is formed to such a depth that the top end of the groove 11 situates below the protrusion 9, upon fitting of the can body 3 as shown in the drawing.

The side plate of the casing 2 further has one or plurality stages of lateral engaging grooves 12 in communication with the vertical guide groove 11.

The lateral engaging groove 12 is used for engaging and supporting the protrusion 9 of the can main body 3 and has a width greater than the engaging diameter of the protrusion 9 and, preferably, smaller than the diameter of the recess 8 of the safety metal stripe 7. With such a constitution, the protrusion 9 is inhibited from engagement with the lateral engaging groove 12 in a state it is covered with the recess 8 of the metal stripe 7 (FIG. 1).

In a case where a plurality stages of lateral engaging grooves 12 are formed, they may be formed independently of each other but, preferably, a lateral groove 12a at the upper stage and a lateral groove 12b at the lower stage are formed continuously by way of a connecting step 12c and, more preferably, a downcoming groove 13 is formed vertically to the lateral groove at the final stage.

In the preferred embodiment shown in FIG. 2, protrusions 9 are formed by a pair in right-to-left symmetry around the periphery of the can main body 3, while vertical guide grooves 11, lateral engaging grooves 12 and downcoming groove 13 are formed each by pair in a right-to-left symmetry around the periphery of the heater casing 2 corresponding to the protrusions 9 on the can main body 3, in order to stably support the can main body 3 on the casing 2.

A plurality of incision portions that can be opened by a finger or nail are formed to the lower circumferential periphery of the heater casing 2, so that air intake ports 14' are formed by opening the incision portions 14. Further, the incision portions 14 can be utilized as legs 15 for setting the heater casing 2 by outwardly opening them.

The solid fuel 10 is contained in the central recess of a holder 16 and disposed at the bottom of the heater casing 2.

As shown in FIG. 2, the holder 16 comprises a central bottom 16a for containing the solid fuel 10 and a plurality of plates 16b extended radially toward the inner wall of the heater casing 2. Further, a V-shaped notch 16c is formed to the side plate between each of the arm plates 16b and 16b, so that the inside of the central recess 16a is deformed corresponding to various shapes of the solid fuel 10 and holding the fuel from the periphery.

A fuse 17 is led out from the solid fuel 10 through a portion of the downcoming groove 13.

Description will now be made how to use the embodiment of the present invention with reference to FIG. 1 to FIG. 6.

In a fit state shown in FIG. 1, the safety metal stripe 7 covers, by its spoon-like recess 8, the protrusion 9 of the can main body 3, and the top end of the stripe 7 is attached on the side of the can body by the connection portion 18. Accordingly, the protrusion 9 of the can main body 3 can not engage the lateral engaging groove 12 of the casing 2 in this state.

Then, when the lid 6 is detached from the can main body 3 to open the can and, further, pulled downwardly together with the safety metal stripe 7, the connection portion 18 between the metal stripe 7 and the side of the can main body 3 is peeled off, by which the safety cover for the protrusion 9 is removed.

Figure 5:
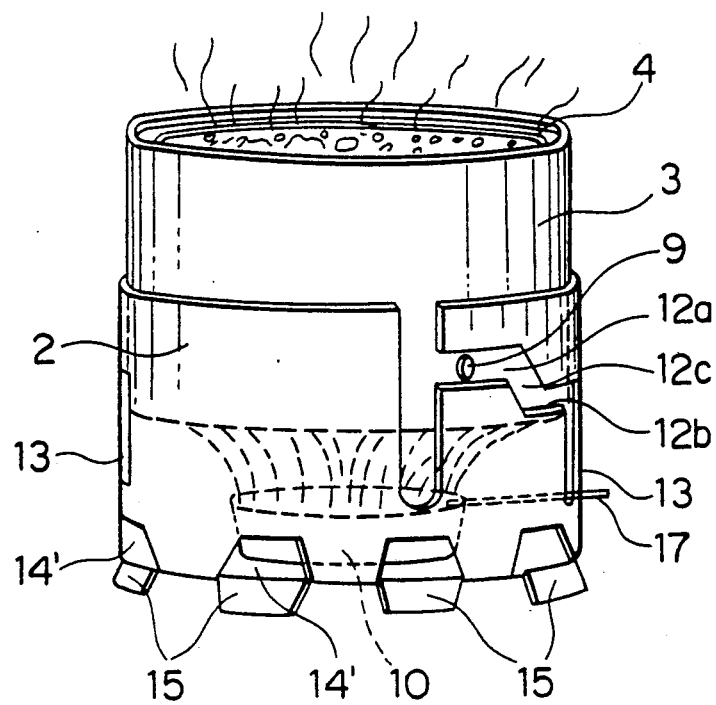

Subsequently, the incision portions 14 of the heater casing 2 are opened to form air intake portions 14' and the protrusion 9 of the can main boy 1 is engaged to the lateral engaging groove of the casing 2 as shown in FIG. 5. Then, a space is formed between the solid fuel 10 and the can main body 3 to enable ignition and heating.

Since the heating power varies between the top end and the lower portion of a flame of the fuel 10, the heating power can be controlled from high to low flame or from that for boiling to temperature keeping by manipulating the protrusion 9 such that the engaging position shifts downwardly from that with the lateral groove 12a at the upper stage to that with the lateral groove 12b at the lower stage. Further, when the protrusion 9 is engaged with the downcoming groove 13 to drop the can main body 3 downward to the holder 16 for the solid fuel, air is interrupted to extinguish the flame.

Since the container for heating canned food according to the present invention has such a structure that the container can not be heated unless the lid for the can main body is opened, there is no danger that the can body is burst by erroneous operation. In addition, since the operation is simple, there is no worry that a user commits an error for the procedures.

In the modified embodiment in which the lateral engaging grooves of the heater casing are formed as a series of multi-stage groves, the can main body can be controlled to each of heating and temperature keeping positions with simple procedures. Especially, if the lateral engaging groove at the lowest stage is connected with the vertical guide groove, since a plurality of vertical grooves are formed at the periphery of the burning portion of the casing, turbulence of air at the inside of the burning portion can be suppressed to prevent the flame from exposing outside, and the flame of the solid fuel can be put off by dropping the protrusion of the can main body into the groove at the final stage.

Further, when the incision portions at the lower portion of the heater casing are opened, air intake ports are formed to improve the burning effect and the casing can be set stably by using the incision portions as legs for the heater.

Furthermore, different from the can main body, the heater casing can be used repeatedly, although the heater casing may also be constituted as a disposable type. Therefore, the heater casing can be used repeatedly with the can main body being constituted as described above, to increase the practical worth.

What is claimed is:

1. A container for heating canned food comprising a heater casing having a hollow cylindrical member for containing a solid fuel at the bottom and a can main body which can be fit into and pulled out of said heater casing, wherein said can main body has a lid which can be detached from the can main body along a cut line, one or more of protrusions formed integrally on the side of the can main body and a safety metal stripe having a base end integrally connected to the lid, a top end formed with a recess for covering one of said protrusions, and a portion which is provisionally connected to the side or the protrusion of the can main body and can be released therefrom when said stripe is pulled downward from above, and said heater casing has one or more of vertical guide grooves for integrally receiving the protrusions on the can main body and the recess of the safety metal stripe covering the protrusion, and one or plurality stages of lateral engaging grooves formed in communication with said vertical groove for engaging the protrusion of said can main body.

2. A container for heating canned food as defined in claim 1, wherein the protrusions of the can main body are disposed in pair in a diametrical symmetry around the periphery of the can main body, and the guide grooves and the lateral engaging grooves of the heater casing are disposed each by pair in a diametrical symmetry around the periphery of the heater casing corresponding to the protrusions of said can main body.

3. A container for heating canned food as defined in claim 1 or 2, wherein the plurality stages of lateral engaging grooves of the heater casing are formed continuously by way of connection steps, and a downcoming groove is disposed to each of the top ends of the lateral groove at the lowermost stage.

4. A container for heating canned food as defined in any one of claims 1 or 2, wherein a plurality of incision portions are formed along cut lines around the periphery in the lower portion of the heater casing.

5. A can main body used for heating canned food, which comprises a lid that can be detached from the can main body along a cut line, one or more of protrusions formed integrally on a side of said can main body, and a safety metal stripe having a base end which is connected to the lid, a top end formed with a recess for covering one of the protrusions and a portion which is connected to the side or the protrusion of the can body and can be released therefrom when the stripe is pulled downward from above.

* * * * *